(12) United States Patent
Elmaleh

(10) Patent No.: US 9,503,899 B2
(45) Date of Patent: Nov. 22, 2016

(54) SYSTEM AND METHOD FOR ACCESS OVER A CABLE TELEVISION NETWORK

(71) Applicant: David R. Elmaleh, Newton, MA (US)

(72) Inventor: David R. Elmaleh, Newton, MA (US)

( * ) Notice: Subject to any disclaimer, the term of this patent is extended or adjusted under 35 U.S.C. 154(b) by 238 days.

(21) Appl. No.: 14/487,174

(22) Filed: Sep. 16, 2014

(65) Prior Publication Data

US 2015/0007240 A1 Jan. 1, 2015

Related U.S. Application Data

(63) Continuation of application No. 13/185,927, filed on Jul. 19, 2011, now Pat. No. 8,837,361.

(51) Int. Cl.
| | |
|---|---|
| *H04W 4/00* | (2009.01) |
| *H04W 12/08* | (2009.01) |
| *H04L 12/28* | (2006.01) |
| *H04N 21/258* | (2011.01) |
| *H04N 21/41* | (2011.01) |
| *H04N 21/4788* | (2011.01) |
| *H04N 21/61* | (2011.01) |
| *H04N 21/436* | (2011.01) |

(52) U.S. Cl.
CPC .......... *H04W 12/08* (2013.01); *H04L 12/2801* (2013.01); *H04L 12/2838* (2013.01); *H04N 21/25816* (2013.01); *H04N 21/4126* (2013.01); *H04N 21/43615* (2013.01); *H04N 21/4788* (2013.01); *H04N 21/6118* (2013.01); *H04N 21/6168* (2013.01); *H04L 2012/2841* (2013.01)

(58) Field of Classification Search
None
See application file for complete search history.

(56) References Cited

U.S. PATENT DOCUMENTS

| | | | | |
|---|---|---|---|---|
| 2007/0100904 | A1* | 5/2007 | Casey | G06F 17/30056 |
| 2008/0151857 | A1* | 6/2008 | Dolgonos | H04W 4/18 370/343 |
| 2008/0320543 | A1* | 12/2008 | Wang | H04N 7/162 725/131 |
| 2011/0143667 | A1* | 6/2011 | Cugnini | H04N 21/6131 455/41.2 |
| 2011/0156879 | A1* | 6/2011 | Matsushita | H04L 63/08 340/10.1 |
| 2011/0283333 | A1* | 11/2011 | Ukkadam | H04L 63/102 725/131 |
| 2011/0296459 | A1* | 12/2011 | Medina | G08B 13/196 725/37 |

* cited by examiner

*Primary Examiner* — Kenny Lin
(74) *Attorney, Agent, or Firm* — Pearl Cohen Zedek Latzer Baratz LLP

(57) ABSTRACT

A system and method for allowing a computing device to associate wirelessly with one or more access points that are connected to a cable TV network when such device is in a range of such access point, even though such wireless device would not generally be authorized to receive content or data from the access point. Signals to and from the wireless device are carried over the cable TV network and transmitted to other devices associated with other access points attached to the cable TV network.

8 Claims, 2 Drawing Sheets

SYSTEM AND METHOD FOR ACCESS OVER A CABLE TELEVISION NETWORK

CROSS-REFERENCE TO RELATED APPLICATIONS

This application is a continuation of U.S. patent application Ser. No. 13/185,927, filed Jul. 19, 2011, which is hereby incorporated by reference.

FIELD OF THE INVENTION

The present invention generally relates to cable television networks, and particularly to transmitting TCP/IP data over a cable television network.

BACKGROUND OF THE INVENTION

Cable-television networks have achieved high penetration rates among households in the developed world. The provision by cable television networks of Internet access and access to other transmission control protocols/Internet protocols (TCP/IP) networks and devices has also achieved high rates of penetration. Similarly, the installed base of wireless routers or other wireless access points in households whose Internet access is provided over cable television lines, is high. Typically, access to a household's wireless router or other wireless access point is restricted to members of the household or other users authorized by the household, even though a range of the wireless router or access point may be far greater than the area covered by the household.

SUMMARY OF EMBODIMENTS OF THE INVENTION

Embodiments of the invention may include a method of receiving from a first mobile computing device, a request for a wireless association with an access point where such access point is linked to a cable television network. The mobile computing device may be identified as included in a memory that is connected to the cable television network, where such memory indicates that the mobile computing device is authorized to associate with one or more of a group of access points that are linked to the cable television network. A signal from a server that is connected to the cable television network, indicating such authorization may be received at an access point, and such signal may confirm that the mobile computing device is authorized to associate with the access point. The access point may transmit a signal from the mobile computing device over the cable television network.

In some embodiments, a first access point may transmit from the mobile computing device a signal in a stream of signals of a voice over IP communication, when the mobile computing device is in a range of the first access point, and a second access point may transmit a second signal in the stream of signals of the voice over IP communication over the cable network when the mobile computing device is in a range of the second access point.

In some embodiments, the range of the first wireless access point overlaps with a range of the second access point, and both the first access point and the second access point transmit the stream of signals of the voice over IP communication over the cable television network when the first device is in the overlapping range.

In some embodiments, the authorization for the mobile computing device to associate with an access point, includes an authorization to associate with the access point only for signals to be transmitted over the cable television network to the second access point, but not for transmission of signals that are not carried on the cable television network.

Embodiments of the invention include a system for communicating over a cable television network, where the system includes a group of connections to a cable television network, some of such connections linked to one or more televisions, where a first of such connections is also linked to a first wireless transmitter and receiver, and a second of such connections is also linked to a second wireless transmitter and receiver. The first wireless transmitter and receiver receives a stream of signals from a wireless device and transmits the stream of signals over the cable television network to a second wireless transmitter and receiver. The second wireless transmitter and receiver transmits over the cable television network the stream of signals from the wireless device when the wireless device enters a range of the second wireless transmitter and receiver.

In some embodiments, a range of the first wireless transmitter and receiver overlaps a range of the second wireless transmitter and receiver.

In some embodiments, a processor stores data on the signals transmitted over the cable television network. Such data may include a quantity of signals and a distance from the first connection to the second connection.

Embodiments of the invention may include a system for communicating over a cable television network, where the system includes a first wireless transmitter and receiver, a second wireless transmitter and receiver, and a third wireless transmitter and receiver, where each of such transmitters and receivers are connected to a cable television network. The first wireless transmitter and receiver is suitable to wirelessly associate with a first device when the first device is in a range of the first wireless transmitter and receiver and is suitable to transmit a signal from the first wireless device over the cable television network to a second device associated with the third wireless transmitter and receiver. The second wireless transmitter and receiver is suitable to associate with the first device when the first device is in a range of the second wireless transmitter and receiver and is suitable to transmit a signal from the first device over the television network to a second device associated with the third wireless transmitter.

In some embodiments, the system may include a processor to receive identification data about the wireless device, and to associate the identification data with the first wireless transmitter and receiver when the wireless device is in a range of the first wireless transmitter and receiver, and is to associate the identification data with the second wireless transmitter and receiver when the wireless device is in a range of the second wireless transmitter and receiver.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

DETAILED DESCRIPTION

Figure 1:
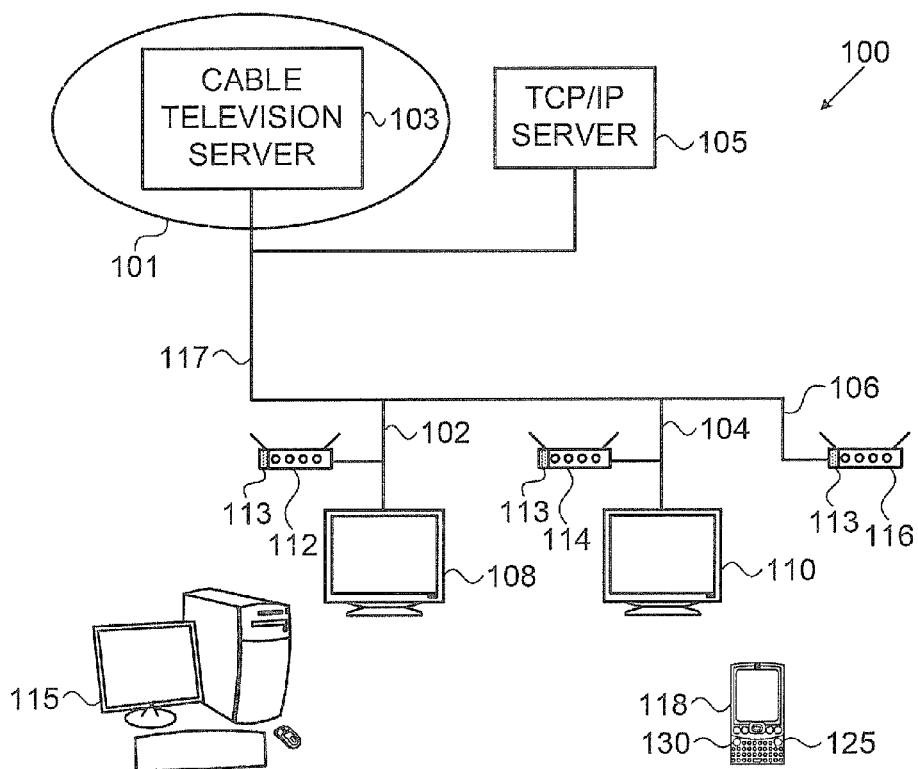
FIG. 1 is a schematic diagram of components of a cable television network carrying data from a TCP/IP network, in accordance with an embodiment of the invention.

In the following description, various embodiments of the invention will be described. For purposes of explanation, specific examples are set forth in order to provide a thorough understanding of at least one embodiment of the invention. However, it will also be apparent to one skilled in the art that other embodiments of the invention are not limited to the examples described herein. Furthermore, well-known features may be omitted or simplified in order not to obscure embodiments of the invention described herein.

Unless specifically stated otherwise, as apparent from the following discussions, it is appreciated that throughout the specification, discussions utilizing terms such as "switching", "directing", "comparing", "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

As used in this application, and in addition to its regular meaning, the term "wireless receiver and transmitter" or "wireless access point" may include one or more antennas suitable to wirelessly receive and/or transmit data such as packet data to and from one or more wireless devices such as mobile wireless communication devices, and to transmit such packets over a wired network. In some embodiments, a wireless access point may include for example a WiFi access point, a wireless local area network point, and/or an access point using the Bluetooth or other standard for providing wireless connectivity to a network. In some embodiments, an access point may function on an IEEE 802.xx standard, though other standards are possible. In some embodiments, an access point may provide to a mobile communication device, connectivity to a TCP/IP network, though connectivity to other networks may also be provided. In some embodiments, a wireless transmitter and receiver may transmit signals from a remote wireless device over a cable television (TV) network.

As used in this application, and in addition to its regular meaning, the term "wireless device" may include for example, an Internet telephone, a tablet computer, laptop computer, netbook computer or other device having a processor, a memory, a transmitter and receiver as well as an input and output device such as a screen, keyboard, keypad, touch screen, microphone, speakers or other input and output device and a capacity to transmit signals in a wireless connection to and from a wireless access point or wireless router.

As used in this application and in addition to its regular meaning, the term "end" or "connection" of a cable television network may include a connection between a cable television network and one or more televisions or other receivers or transmitters of signals to and from the cable television network. An end may include a set top box, a converter box, a Net Top Box, an Internet protocol television (IPTV) box or other such equipment as may be typically found in a home, residence or other cable TV consumer area, and that converts signals transmitted over the cable TV network, into content.

As used in this application, and in addition to its regular meaning, the term "range" may define a maximum distance from a wireless receiver and transmitter wherein an association with a wireless device may be maintained. In some embodiments, range may refer to or be defined by the distance or area within a radius of a reception area of a single access point or to a set of access points that may be in a particular area such as an area where a reception or transmission area of one access point overlaps with a reception or transmission area of another access point. Such area may range from tens of meters to several hundred meters Or more.

An embodiment of the invention may be practiced through the execution of instructions such as software that may be stored on an article such as a disc, memory device or other mass data storage article. Such instructions may be for example loaded into a processor and executed on one or more computerized platforms. It will also be appreciated that while embodiments of the current invention are primarily described in the form of methods and devices, the invention may also be embodied, at least in part, in a computer program product as well as a system comprising a computer processor and a memory coupled to the processor, wherein the memory is encoded with one or more programs that may perform the functions disclosed herein.

Embodiments of the invention may include an article such as a computer or processor non-transitory readable medium such as memory 109 shown below or a memory in another device, or a computer or processor non-transitory storage medium, such as for example a memory, a disk drive, or a USB flash memory, encoding, including or storing instructions, e.g., computer-executable instructions, which when executed by a processor or controller, carry out methods disclosed herein.

Reference is made to FIG. 1, a schematic diagram of components of a system in accordance with an embodiment of the invention. In some embodiments, system 100 may include a cable television network 101 that may be connected to a number of homes, buildings or customers 102, 104 and 106. At some of these ends or customers 102 and 104, the cable TV network 101 may be connected to televisions 108 and 110, respectively, and to wireless access points 112 and 114, respectively. One or more of such access points 112, 114, and 116 may include one or more processors 113 and may include a memory. In some embodiments, signals from cable TV network 101 may also be transmitted by access points 112, 114 and 116 to a mobile computing device or wireless device 118. Mobile computing device 118 may include one or more processors 125 and one or more data storage or memory units 130 that may be linked to such processor 125. Processor 125 may execute code or instructions that are stored in memory 130. In some embodiments, access point 112 may be included in a housing of a television or television set-top box or in some other connection of a cable television network to household equipment.

In some embodiments, signals from cable TV network 101 may include content that is typically broadcast over cable TV network 101 such as programs, music, video or other content, and may include Internet web pages or other content, information or signals generally available on the Internet. In some embodiments, either or both of customer's TV 108 and wireless device 118 may download content from cable TV network 101 and upload content to cable TV network 101, but rather than such downloads and uploads coming from an Internet loop, the source of downloaded data is from a channel on cable TV network 101, and the destination of such data is to such channel. For example, cable TV network 101 may provide content to a television 108 and to device 118 by way of access point 112. An operator of cable TV network 101 may insert commercial messages in such content. A system may allow television 108 and/or a computer or wireless device 118 to download and upload data from a cable television network 101 loop, rather than splitting signals passed through a cable into television signals on the one hand and Internet signals on the other hand.

In some embodiments, one or more frequencies on a cable TV channel, such as may be designated on the line that carries cable TV content, may be designated for content that originates from the Internet. This Internet channel may be navigated or controlled by for example a web browser, and may be used for both uploading and downloading data to and from remote servers. A cable TV network operator may make its own content available on such channel or may intersperse its own advertising or advertising from its sponsors, onto content that is received from the Internet. The use of a cable channel to provide Internet access may allow a cable channel to regulate, control and charge for access to content on such channel.

For example, in some embodiments, a channel on a cable television line may be designated to also carry or accept TCP/IP transmissions. A server 103, such as a server supplying cable TV content over a cable TV line 117 may also direct onto such designated channel data from a TCP/IP server 105. A client 115 such as a customer of the cable TV network 101, may wireless associate with access point 112 upload a command to cable TV server 103, which may draw the data requested by the client 115 and transmit or direct such requested data over the designated channel on the cable line 117. Cable TV server 103 may also add or intersperse into the data from TCP/IP server 105, other data as may be provided from cable TV server 103.

In operation, a client 115 or user of cable television network 101 may issue a request for data from a TCP/IP network such as the Internet, and such request may be transmitted over a cable television line 117 to one or more of server 103 or server 105. Server 105 may provide the requested data and such data may be transmitted to client 115 along with data from server 103. Client 115 may view or receive data from both server 103 and server 105, in for example a single screen-view, such as news content from server 105 and advertising content from server 103. In another example, server 105 may transmit a stream of data such as video data to client 115 over line 117, and server 103 may intersperse another stream of data, such as commercial data onto line 117 so that client receives for example a television program from server 105, interspersed with commercial videos directed from server 103.

Figure 2:
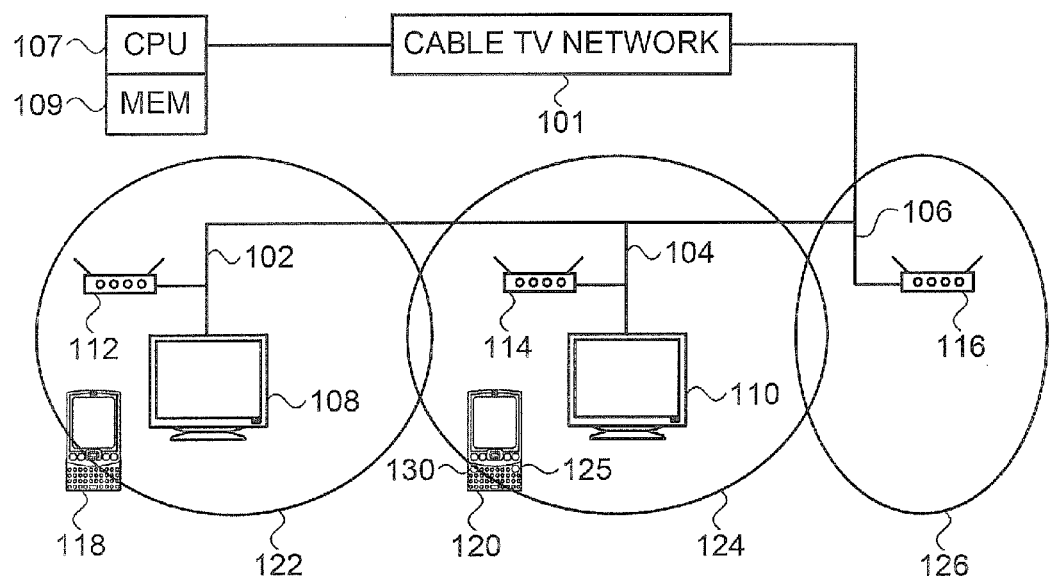
FIG. 2 is a schematic diagram of components of a system for transmitting data from a wireless device over a cable television network.

Reference is made to FIG. 2, a schematic diagram of wireless access points with overlapping ranges in accordance with an embodiment of the invention. In some embodiments, wireless device 118 may be in a range 122 of access point 112 and may wirelessly associate with access point 112, such that access point 112 may provide wireless device 118, such as a laptop or other mobile computing device, with access to for example a TCP/IP network, such as for example the Internet, that may be part of, associated with or carried by cable TV network 101. A second wireless device 120, such as a tablet computer or IP phone, may be in a range 124 of access point 114, and may associate with AP 114 to access a TCP/IP network connected with cable TV network 101.

In some embodiments, device 118 which may associate only with access point 112 when it is in a range 122 of access point 112, may also associate with access point 114 when it is in a range 124 of such access point 114. For example, device 120 may associate with access point 114 and transmit signals as part of a voice over IP (VOIP) call to device 118 where such signals may be carried by way of cable TV network 101. As device 120 is moved from a range 124 of access point 114 to a range 126 of access point 116, device 120 may establish an association with access point 116, and the signals that make up the same VOIP call may be transmitted by access point 116 over cable TV network 101 to access point 112. The VOIP call may continue despite the passing of device 118 from a range 122 of access point 112 to access point 114.

In some embodiments, range 124 of access point 114 and range 126 of access point 116 may overlap, and in the overlapping area, signals may be transmitted by both of such access points 114 and 116 over cable TV network 101, and a single VOIP call may continue uninterrupted as device 120 passes from a range 124 of a first access point 114 to range 126 of the second access point 116. In this way, device 120 may continue a call or other association with device 118, even as device 120 passes from range 124 to range 126.

In some embodiments, a processor 107 and memory 109 that may be associated with cable TV network 101 may track and store a quantity, sum or a number of signals or packets that are transmitted by device 120 over cable TV network 101, and may track a distance from end 102 to any of ends 104 and 106. Pricing information may be developed to charge device 120 based on one or more of a sum of signals carried by cable TV network 101 and a distance from a wireless receiver and transmitter that picks up the signals of device 120, to wireless receiver transmitter that carries the signals to device 118.

In some embodiments, access point 112 may simultaneously associate with more than one wireless device, where a first of such devices 118 may belong to a household that receives cable TV service by way of end 102, and a second device 120 may be passing by or near range 122, but may not belong to the household that receives cable TV service by way of end 102. Device 120 may have identification or authentication information allowing it to associate with access point 112, but not allowing it to receive signals that may be provided to TV 108 or to device 118.

In some embodiments, an access point 112 may restrict associations to devices that are authorized or authenticated for associations with the access point or network. For example, an access point 112 in a household may permit associations only with devices that are identified as belonging to or affiliated with the household, while other devices that attempt to associate with access point 112 may be excluded. In some embodiments, upon an attempted association by wireless device 118, access point 112 may query cable television server 103 which may recognize device 118. Server 103 may signal access point 112 to authorize or allow an association by device 118 only with respect to signals to be carried over cable television network 101, but not with respect to signals to be transmitted to other devices that may be associated with access point 112, such as for example devices within a household network of a customer 102. For example, access point 112 may, upon a request by device 118 for an association, query server 103 to indicate whether device 118 corresponds to a record stored in a memory associated with server 103 that includes a permission or authorization for signals from device 118 to be transmitted over cable television network 101, and upon a confirmation of such identity or authorization, access point 112 may allow an association for signals that are to be transmitted from device 118 over the cable television network 101. An authorization may be transmitted to other access points 114 and 116 to allow a transmission of signals from wireless device 118 over such other access points 114 and 116, when such wireless device 118 is in a range 124 of access point 114 or a range 126 of access point 116. For example, a telephone number of other identifier of device 118 may be listed in a memory 109 as part of an authorization to permit signals from such device to be carried over network 101. Upon a request by device 118 for an association with access point 112, access point may query processor 107 linked to memory 109, to determine if signals from device 118 are authorized for transmission over network 101. Upon delivery of an authorization from processor 107 to one or more of access points 112, 114 and 116, an association may established between device 118 and one or more of such access points, and signals from device 118 may be transmitted by one or more of such access points 112, 114 and 116 over network 101.

In some embodiments, access point 112 may include two or more authentication or access codes or systems, where a first authentication code permits an association by a first group of devices such as devices that are affiliated with or recognized by the user or customer 102, and a second group permits association by a device that is to be granted access to one or more resources available over the cable television network 101. In some embodiments, a user of a device 118 may register or be identified with server 103 to get access to signals to be delivered over cable television 101. With such registration, device 118 may gain an association with one or more access points 114 or 116 whenever such device is in a range of such access points. Such association may allow device 118 to communicate over cable television network 101 with another device 120 that is also in an association with an access point 114 connected to cable television network 101. Device 118 may maintain such communication even when it leaves a range 122 of access point 112 and enters a range 126 of another access point 116.

In some embodiments, overlapping coverage areas of numerous access points in, for example a neighborhood, may afford wireless association over large areas where the signals are carried from the various wireless access points in a neighborhood to and over the cable TV network.

Figure 3:
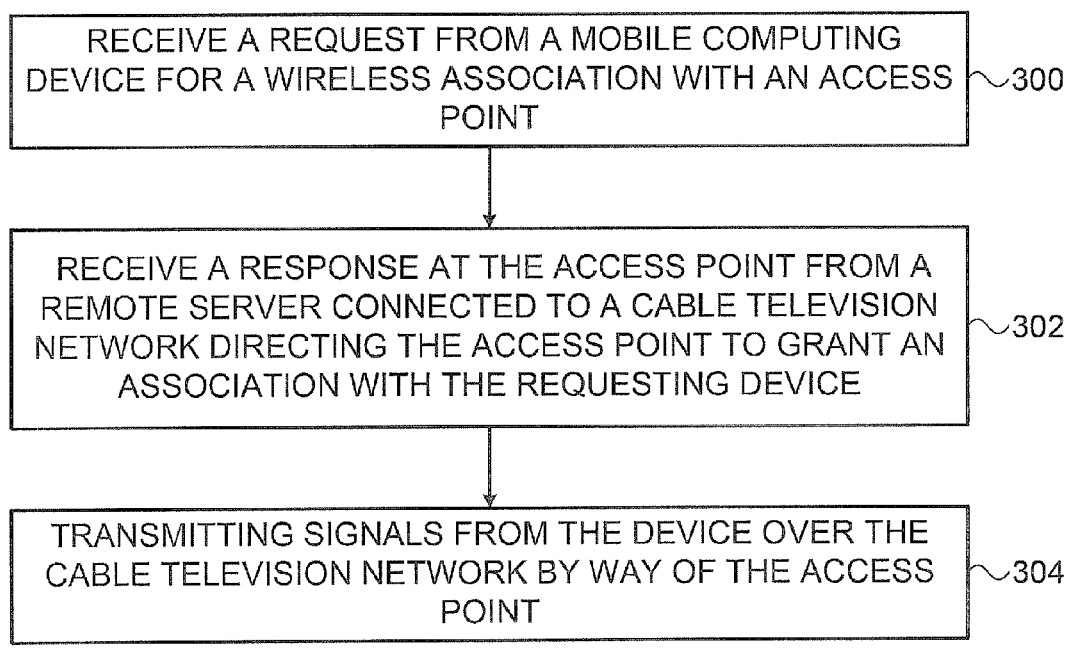
FIG. 3 is a flow diagram of a method in accordance with an embodiment of the invention.

Reference is made to FIG. 3, a flow diagram of a method in accordance with an embodiment of the invention. In block 300, a signal from a mobile computing device may be received by for example a processor associated with an access point that is linked to a cable television network, and such signal may include a request by the mobile computing device for a wireless association with the access point. In block 302, a processor associated with the access point may receive a signal from a remote server that is also connected to the cable television network, where the signal includes a confirmation of an authorization for the mobile computing device to associate with an access point that is connected with the cable television network. In block 304, a wireless association may be established between the access point and the mobile computing device, and a signal from the mobile computing device may be transmitted by way of the access point over said cable television network. In some embodiments, the transmission of signals in the wireless association may be permitted even though the mobile computing device may not have access to other computer devices or resources that are in an association with the access point that establishes the wireless association. In this way, access to resources or signals carried over the cable television network may be separate from access to other resources in association with the access point, and the access point may associate with the mobile computing device only for signals that are to be transmitted over the cable television network but not to other resources associated with the access point.

An authorization for the mobile computing device to associate with the access point, may be issued by for example a server that accesses a stored record corresponding to the mobile computing device, where such record indicates that the mobile computing device is authorized associate with more than one access point that is connected to the cable television network. In some embodiments, authorization issued by the server, may include an authorization for signals from the mobile computing device to be carried over the cable television network to other access points that are linked to the cable television network.

In some embodiments, a device may transmit a stream of signals such as those which are part of a voice over IP communication by way of a first access point when the device is in a range of the first access point, and the device may continue to stream signals that make up the same voice over IP communication from a second access point, when the device is in a range of the second access point.

In some embodiments, the range of the first wireless access point may overlap with the range of the second access point, and in such range, signals from the device may be transmitted from both access point to the cable television network.

It will be appreciated by persons skilled in the art that embodiments of the invention are not limited by what has been particularly shown and described hereinabove. Rather the scope of at least one embodiment of the invention is defined by the claims below.

I claim:

1. A system for communicating over a cable television network comprising:
   a plurality of connections to a cable television network, each of said connections linked to a television, a first of said connections also linked to a first wireless transmitter and receiver, and a second of said connections also linked to a second wireless transmitter and receiver;
   wherein said first wireless transmitter and receiver are to receive a stream of signals from a wireless device and is to transmit said stream of signals over said cable television network to said second wireless transmitter and receiver; and
   wherein said second wireless transmitter and receiver are to transmit over said cable television network said stream of signals from said wireless device when said wireless device enters a range of said second wireless transmitter and receiver.

2. The system as in claim 1, wherein a range of said first wireless transmitter and receiver overlaps said range of said second wireless transmitter and receiver.

3. The system as in claim 1, comprising a processor to store data on said signals transmitted by said wireless device over said cable television network.

4. The system as in claim 3, wherein said data comprises a quantity of said signals and a distance from said first connection to said second connection.

5. The system as in claim 1, wherein said first wireless transmitter and receiver is included in a housing of a first of said connections to said cable television network.

6. A system for communicating over a cable television network comprising:
- a first wireless transmitter and receiver;
- a second wireless transmitter and receiver; and
- a third wireless transmitter and receiver;
- each of said wireless transmitters and receivers being connected to a cable television network,
- wherein said first wireless transmitter and receiver is suitable to wirelessly associate with a first device when said first device is in a range of said first wireless transmitter and receiver and is suitable to transmit a signal from said first wireless device over said cable television network to a second device associated with said third wireless transmitter and receiver, and
- wherein said second wireless transmitter and receiver is suitable to associate with said first device when said first device is in a range of said second wireless transmitter and receiver and is suitable to transmit a signal from said first device over said television network to said second device associated with said third wireless transmitter.

7. The system as in claim 6, wherein a range of said first wireless transmitter and receiver overlaps with a range of said second wireless transmitter and receiver, and wherein said first wireless transmitter and receiver and said second wireless transmitter and receiver transmit said signal over said cable television network when said first device is in said overlapping range.

8. The system as in claim 6, comprising a processor to receive identification data of said wireless device, and to associate said identification data with said first wireless transmitter and receiver when said wireless device is in a range of said first wireless transmitter and receiver, and is to and to associate said identification data with said second wireless transmitter and receiver when said wireless device is in a range of said second wireless transmitter and receiver.

* * * * *